United States Patent [19]
Ward et al.

[11] Patent Number: 5,245,659
[45] Date of Patent: Sep. 14, 1993

[54] CONSTANT RATIO CODING FOR MULTIPATH REJECTION AND ECCM ENHANCEMENT

[75] Inventors: Robert L. Ward, Lawrenceville, N.J.; Richard W. Marsh, Silver Spring; Ronald M. Benincasa, Pasadena, both of Md.

[73] Assignee: The United States of America as represented by the Director, National Security Agency, Fort George G. Meade, Md.

[21] Appl. No.: 964,238

[22] Filed: Nov. 17, 1978

[51] Int. Cl.$^5$ .......................... H04L 9/22; G01S 7/36; G01S 7/66; G01S 1/24
[52] U.S. Cl. ........................................ 380/46; 342/16; 342/388; 342/189; 375/58
[58] Field of Search ............... 343/5 PN; 364/717; 331/78; 342/16, 189, 388; 375/58; 380/46

[56] References Cited

U.S. PATENT DOCUMENTS

| | | | |
|---|---|---|---|
| 3,174,151 | 3/1965 | Abourezk | 343/103 |
| 3,378,847 | 4/1968 | Grover et al. | 343/103 |
| 3,439,279 | 4/1969 | Guanella | 331/78 X |
| 3,700,806 | 10/1972 | Vasseur | 331/78 X |
| 3,728,529 | 4/1973 | Kartchner et al. | 364/717 |
| 3,746,847 | 7/1973 | Maritsas | 331/78 X |
| 3,858,216 | 12/1974 | DeVaul | 343/103 |
| 3,868,691 | 2/1975 | Miller et al. | 343/103 |

OTHER PUBLICATIONS

"Pseudo Random Truly Uniform Noise Generator", by N. Abbattista et al., Instituto di Fisica dell'Università, Bari, Italy, Nuclear Instruments and Methods, 60, (1968), 317–322; ©North-Holland Publishing Co., Dec. 14, 1967.

*Primary Examiner*—Gilberto Barrón, Jr.
*Attorney, Agent, or Firm*—John R. Utermohle; Thomas O. Maser

[57] ABSTRACT

A method is disclosed for encoding signals for transmission to provide signals which simultaneously have specifiable autocorrelation properties and low predictability. To enhance the accuracy of time of arrival measurements in the presence of either noise or multipath due to skywaves in systems such as LORAN, the coding method provides for low autocorrelation function values at time offsets approximately equal to the expected delay between direct waves and skywaves. This is accomplished by constructing the codeword which is used to encode the signal, from an Nth difference constant ratio codeword, where the expected time delay is equal to N-bits. The constant ratio codewords and the transmitted codewords are both pseudo-randomly generated, resulting in a transmitted signal having very low predictability to an unintended recipient, thereby considerably reducing the effectiveness of attempts at jamming or other electronic countermeasures attacks.

13 Claims, 2 Drawing Sheets

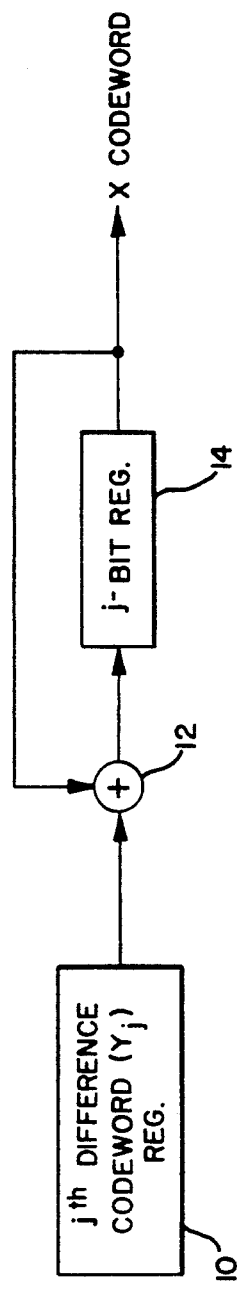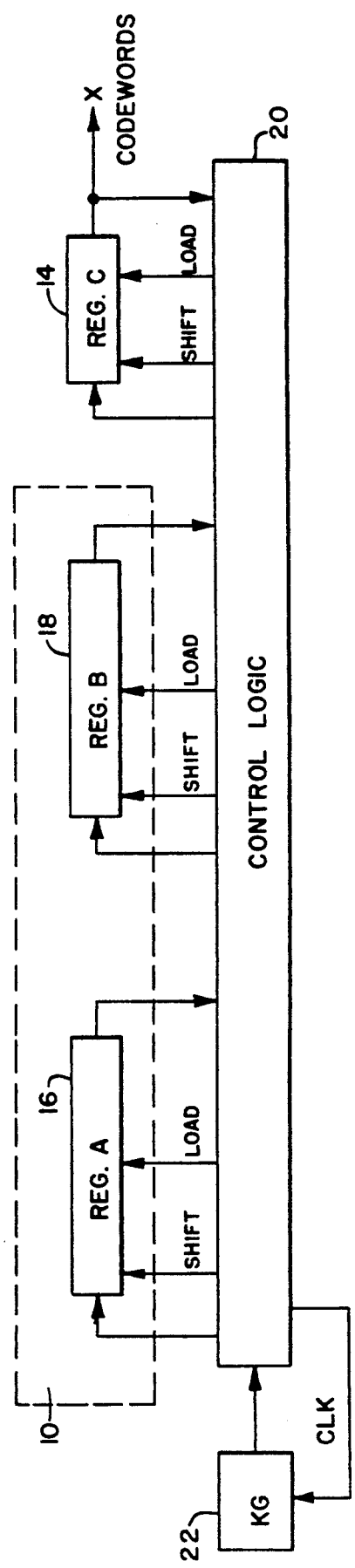

LOAD

CONTROL BIT = 0

CONTROL BIT = 1

CODEWORD CONSTRUCTION

CONSTANT RATIO CODING FOR MULTIPATH REJECTION AND ECCM ENHANCEMENT

BACKGROUND AND SUMMARY OF THE INVENTION

The present invention relates generally to methods of encoding signals to provide specifiable autocorrelation properties and in particular to methods for encoding signals to provide low autocorrelation at predetermined offsets and low predictability to unauthorized recipients, in order to reduce the effects of multipath, noise and electronic countermeasures (ECM).

There are many applications where it is desirable to encode signals such that the encoded signals have certain specifiable autocorrelation properties. Typical of such applications are those where it is required to synchronize a receiver to a received signal, or to measure its time of arrival at the receiver. For example, radar is one application where it is desirable to be able to accurately determine the time of arrival of the return signals reflected from targets, in order to measure the target's range from the radar. Often this must be done in presence of noise or clutter caused by reflections from the ground or other objects, which obscure the return signal and make the measurement difficult.

A convenient way of overcoming the undesirable effects of noise and to improve the accuracy of the measurement is to perform a correlation process, since it is known that the autocorrelation function has a maximum value at zero time offset. A correlation process can be implemented by multiplying the return signal by a delayed replica of the transmitted signal, which is stored in the receiver, and performing an integration. When the delay is adjusted to equal the total round trip time of the signal from the radar to the target, the correlation value will be a maximum. At delays other than those equal to the exact round trip time of the signal, the offset will be non-zero and the correlation value will be less than the maximum. Thus, the round trip time can be easily determined by adjusting the delay until the correlation value is maximized.

Another application where signals having good autocorrelation properties are desirable, is in navigational systems such as LORAN, where the exact time of arrival of signals from several known locations must be measured with respect to a reference time. From these measurements, the location of the receiver can be determined. Since these navigational signals are often corrupted by noise and multipath, these time of arrival measurements can be difficult to make accurately. For example, in LORAN, transmitted signals can be reflected from various atmospheric layers to produce skywaves, which can arrive at the receiver overlapping the direct, ground wave signal. Furthermore, these skywave signals may at times have a greater strength than the direct wave. This results in a self-jamming effect. It is therefore necessary to be able to discriminate between skywaves and ground waves. An autocorrelation process is a convenient manner of accomplishing this.

Receivers capable of performing autocorrelation functions are well known. For example, see U.S. Pat. No. 3,868,691 to Miller et al., which discloses an automatic 2-step correlation receiver for LORAN. Another method of discriminating between the direct waves and skywaves in LORAN is disclosed in U.S. Pat. No. 3,858,216 to DeVaul, wherein the signal amplitude of received waves is determined by detecting the slope of the first derivative, and skywave rejection is performed by detecting the timing between various portions of the received signal envelope. U.S. Pat. No. 3,174,151 to Abourezk, discloses a system for detecting synchronization on skywaves by detecting the presence of signals received just prior to the signal on which the receiver is synchronized. It is based on the principle that since skywaves travel a greater distance than ground waves, they arrive at a receiver later in time than the ground waves. U.S. Pat. No. 3,411,089 to Gicca, discloses a system for coding transmitted signals with a multiplicity of frequencies, in patterns to represent the information being transmitted, in order to reduce the effectiveness of jamming, and to enhance the detectability of the signals in the presence of noise.

Since the autocorrelation function has a maximum value at zero offset, the operation of correlation receivers can be enhanced by encoding the transmitted signals such that at non-zero offsets the autocorrelation values are small with respect to autocorrelation value at zero offset. Ideally, it is desirable that the transmitted signal be coded such that it has small absolute non-cyclic autocorrelation function values at all except zero offsets. Thresholds could then be easily established and zero offset determined whenever the autocorrelation value exceeds the threshold. Unfortunately, binary words having this property are rare. A coding scheme currently used by LORAN C employs complementary pairs of codewords. In this scheme, two words are transmitted such that when individually autocorrelated, the values obtained at the same non-zero offset sum to zero. At zero offset, the summed values of the autocorrelation functions are double that of a single word. This improves the determination of the time of arrival of the ground wave signal and effectively eliminates the problem caused by skywaves, since their contribution to the correlations sums to zero.

Complementary pair codewords may or may not exist, however, depending upon the number of bits required. For example, they are known to exist if the number of bits in the word is of the form $2^{a+1}5^b13^c$, where a, b and c are non-negative integers. The LORAN D system proposes to use 16-bit words. It is therefore possible to find such complementary pair codewords for use on LORAN D, and in fact there are exactly 768 such pairs.

In addition to encoding signals to provide good autocorrelation properties, it is often desirable to encode signals so that they have low predictability to unauthorized recipients. This renders the signals less susceptible to electronic countermeasures, such as jamming, which may be employed by a hostile military force during an armed confrontation. In order to provide low predictability, it is necessary that the codewords have a very low redundancy and a long mean time to certainty. The redundancy of codewords is determined by finding the difference between the probabilities of right and wrong guesses for each bit of a codeword, given all previous codewords. Mean time to certainty of a codeword is determined by measuring the number of bits which must be observed, on the average, before the remainder of the codeword is completely determined.

While the coding of LORAN D using complementary pairs provides desirable autocorrelation properties, these complementary pairs have unacceptably high levels of predictability, which renders them highly susceptible to jamming or other ECM attacks. For example, it can be shown that the first word of a 16-bit complementary pair has an expected redundancy of 7⅔ bits, i.e., one expects to guess correctly 11 5/6 of the 16 bits. Given the first word the expected redundancy of the second word is 14-bits, i.e., one expects 15 correct guesses out of 16 bits. Thus the total redundancy is 21⅔ bits out of 32, a rather large value. The mean time to certainty of the first word of a pair is 10⅓ bits, and given the first word, the mean time to certainty of the second word is a mere 2 5/6 bits.

It is desirable therefore to provide a coding scheme which simultaneously has good autocorrelation properties in order to provide good multipath rejection, while at the same time having low predictability, in order to reduce the effectiveness of ECM attacks. Accordingly, it is an object of the invention to provide an improved method and apparatus for coding which has these desirable properties.

There are other applications where it may be desirable to provide codewords having specifiable autocorrelation properties, i.e., a high correlation value, at predetermined offsets, whether or not it is also desirable to provide low predictability. Consequently, it is additionally an object of the invention to provide a method and apparatus for coding in which the codewords have specifiable autocorrelation properties.

An apparatus for generating n-bit codewords, X, for encoding a signal to provide predetermined autocorrelation properties at an offset of j bits, which accomplishes these objectives and has other advantages may include means for generating $(n-j)$-bit codewords, $y_j$, said codewords having a predetermined ratio of logical 1's to logical 0's and said codewords being the jth difference of said X codewords, and means for combining the $n-j$ bits of said $y_j$ codewords with j arbitrary bits to form said n-bit codewords X.

A method of constructing n-bit codewords, X, for encoding a signal for transmission to provide signal properties facilitating rejection at a receiver of multipath signal waves arriving at the receiver delayed with respect to direct waves, which accomplishes these and other objectives, may include the steps of generating a sequence of $(n-j)$-bit codewords, $y_j$, where the expected delay between the time of arrival of the direct and the multipath signal waves is j bits, the $y_j$ codewords being the jth difference of the X codewords, and the $y_j$ codewords further being constant ratio codewords having a ratio of logical 1's to logical 0's approximately equal to one; and combining the $y_j$ codewords with j arbitrary bits to form the X codewords.

BRIEF DESCRIPTION OF THE DRAWINGS

FIG. 1 is a generalized block diagram illustrating the manner in which a codeword having specifiable autocorrelation properties may be obtained from the jth difference codeword.

FIG. 2 illustrates a preferred embodiment of an apparatus for generating codewords having specifiable autocorrelation properties and low predictability.

DESCRIPTION OF PREFERRED EMBODIMENTS

Figure 3A:
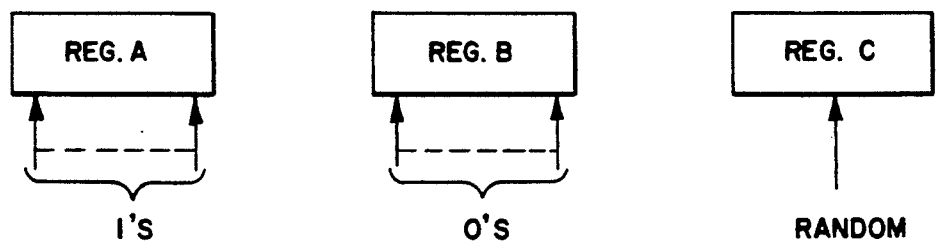
FIGS. 3A-3D illustrate the operation of the apparatus illustrated in FIG. 2 for performing its intended function.

Prior to describing preferred embodiments of the invention, it will be helpful to present a brief discussion of the underlying theory, in order to facilitate the understanding of the invention.

Consider an n-bit sequence, X, which represents an n-bit codeword, where $$X = (x_0, x_1, \ldots, x_i, \ldots, x_{n-1}). \tag{1}$$

The non-cyclic autocorrelation of the sequence X at offset t is given by $$R(t,X) = \sum_{i=0}^{n-1-t} (-1)^{x_i + x_{i+t}} \tag{2}$$

where the exponent may be reduced modulo two. In particular, for any offset $t = j$ $$R(j,X) = \sum_{i=0}^{n-1-j} (-1)^{y_i}, \tag{3}$$

where $x_i \equiv x_i \oplus x_{i+j}, \ 0 \leq i \leq n-1-j,$ \quad (4)

and $Y_j = (y_0, y_1, \ldots, y_i, \ldots, y_{n-1-j})$ \quad (5)

is defined as the jth difference of the sequence X. The symbol "≡" in equation (4) denotes congruence modulo 2.

The symbol "⊕" denotes mod 2 addition. Equation (3) may be rewritten as $$R(j,X) = (n-j) - 2 \sum_{i=0}^{n-1-j} y_i, \tag{6}$$

which indicates that for a given n and j, the value of the autocorrelation function, $R(j,X)$, of the sequence X at offset j, is determined by the number of $y_i$'s in the jth difference of the sequence X which have the value 1, i.e., the density of 1's in the jth difference codeword, $Y_j$.

As an example, consider a system where it is desired to encode a transmitted signal to provide good discrimination between direct and multipath or reflected waves, and assume that the reflected waves are expected to be offset at most one bit with respect to the direct waves. Therefore, to provide good discrimination it is desirable that a code be used which has a low autocorrelation value at an offset of one bit or $j=1$. From equation (6), the autocorrelation value at this offset is $$R(1,X) = (n-1) - 2 \sum_{i=0}^{n-2} y_i, \tag{7}$$

which has a minimum absolute value of $\frac{1}{2}(1+(-1)^n)$. This value is obtained when the density of 1's in $Y_1$ is either $$\left[\frac{n-2}{2}\right] \text{ or } \left[\frac{n}{2}\right],$$

where the square brackets indicate the greatest integer function, i.e., $$\left[\frac{n}{2}\right] \text{ denotes the greatest integer} \leq \frac{n}{2}.$$

Stated another way, the autocorrelation value is a minimum when the first difference codeword, $Y_1$, is a constant ratio codeword (CRC) having a ratio of 1's to 0's of approximately one. There are precisely $$\binom{2\left[\frac{n}{2}\right]}{\left[\frac{n}{2}\right]} \tag{8}$$

such choices of $Y_1$, where the large parentheses indicate the statistical symbol for a combination. Furthermore, for any given $Y_1$, there are two complementary X's which have $Y_1$ as their 1st difference, one with $x_0=0$ and one with $x_0=1$. Thus, there are $$2\binom{2\left[\frac{n}{2}\right]}{\left[\frac{n}{2}\right]} \tag{9}$$

possible codewords, X, such that $|R(1,X)| = \frac{1}{2}(1+(1)^n)$.

From equations (1) and (4) the X codewords are related to the $Y_j$ codewords according to the following relationship:

$$x_i = \begin{cases} z_i & , \text{for } i < j \\ y_{i-j} \oplus x_{i-j} & , \text{for } j \leq i \leq n-1, \end{cases} \tag{10}$$

where $z_0, z_1, \ldots, z_i, \ldots, z_{j-1}$, are $j$ arbitrary bits.

In determining the predictability of the codewords, X, it is observed that the first bit, $x_0$, of X is completely unpredictable, since the number of codewords having $x_0=0$ is the same as those having $x_0=1$. Furthermore, in determining the expected redundancy of a randomly chosen codeword, X, it suffices to compute the redundancy of the associated difference codeword, $Y_1$, of X. As with the X codewords, the first bit, $y_0$, of $Y_1$ is completely unpredictable since there are an equal number of codewords having $y_0=0$ as there are having $y_0=1$. Therefore, the expected redundancy of the first bit is zero. If $E(p)$ is the expected redundancy of bit $y_p$, given that bits $y_0, y_1, \ldots, y_{p-1}$ have been observed, the total expected redundancy, $\bar{E}$, of Y is $$\bar{E} = \sum_{p=o}^{n-2} E(p). \tag{11}$$

To evaluate the expected redundancy, $E(p)$, of bit $y_0$, consider that the first bit $y_0=0$ and $p$ bits, $y_0, y_1, \ldots, y_{p-1}$, have been observed having $(k+1)$ 0's. If $k+1 < p/2$, predict that $y_p=0$, but if $k+1 \geq p/2$, predict $y_p=1$. Among all of the codewords which begin with the observed $p$ bits, $y_0, y_1, \ldots, y_{p-1}$, there are $$\binom{2\left[\frac{n}{2}\right]-1-p}{\left[\frac{n}{2}\right]-2-k}$$

which have $y_p=0$ and $$\binom{2\left[\frac{n}{2}\right]-1-p}{\left[\frac{n}{2}\right]-2-k}$$

which have $y_p=1$. Thus, the number of correct guesses minus the number of incorrect guesses will be the absolute value of the difference between these two numbers. Since this value is independent of the order of the $p-1$ bits, $y_1, y_2, \ldots, y_{p-1}$, there will be $$\binom{p-1}{k}$$

different observed codewords with $(k+1)$ 0's, all of which will have this same value. Hence the total number of correct guesses minus incorrect guesses, given $y_0=0$, will be $$\sum_{k=o}^{p-1}\binom{p-1}{k}\left|\binom{2\left[\frac{n}{2}\right]-1-p}{\left[\frac{n}{2}\right]-2-k} - \binom{2\left[\frac{n}{2}\right]-1-p}{\left[\frac{n}{2}\right]-2-k}\right|. \tag{12}$$

A similar analysis can be performed for the case $y_o=1$ and it can be shown that the total expected redundancy is $$\bar{E} = \left[\frac{2^{2[n/2]} + \frac{1}{2}(1+(-1)^{n+1})}{\binom{2\left[\frac{n}{2}\right]}{\left[\frac{n}{2}\right]}}\right] - 2. \tag{13}$$

To find the mean time to certainty, note that either $[n/2]$ 0's must be observed in the first difference, $Y_1$, before the remaining bits of $Y_1$, and hence, X, can be determined. If $C(m)$ is the probability that the bits $x_0, x_1, \ldots, x_m$ determine X, but the bits $x_0, x_1, \ldots, x_{m-1}$ do not, then $$C(m) = \frac{2\binom{m-1}{[n/2]-1}}{\binom{2[n/2]}{[n/2]}}, \quad (14)$$

and the total mean time to certainty, $\bar{C}$, is given by $$\bar{C} = \left(\sum_{m=[n/2]}^{n-1}(m+1)C(m)\right) - \frac{n}{2}(1+(-1)^{n+1}), \quad (15)$$

which can be shown to be approximately equal to $(n-1)-\frac{1}{2}(1+(-1)^{n+1})$, for n large.

As a specific example, assume it is desired to encode a LORAN D system in order to provide good discrimination between skywaves and groundwaves. LORAN D uses 16-bit words and skywaves are typically observed to be offset with respect to groundwaves by at most one bit. From equation (7), the minimum absolute value of the autocorrelation function R(1,X) is 1, which occurs when $Y_1$ contains either 7 or 8 ones. There are 12,870 such choices of $Y_1$ and thus, 25,740 possible X's, from equation (9).

For this set of 25,740 codewords, the following table gives the number of codewords having a maximum value, M(X), of $|R(t,X)|$ and the minimum offsets, t, for which they occur, where t is between 2 and 12.

| M(X) | 2 | 3 | 4 | 5 | 6 | 7 | 8 | 9 | 10 | 11 | 12 |
|---|---|---|---|---|---|---|---|---|---|---|---|
| 2 | 64 | | 16 | | 0 | | 0 | | 0 | | 0 |
| 3 | | 824 | | 360 | | 280 | | 176 | | 48 | |
| 4 | 2184 | | 1264 | | 888 | | 648 | | 152 | | 144 |
| 5 | | 2492 | | 1852 | | 1128 | | 608 | | 384 | |
| 6 | 2444 | | 1464 | | 1148 | | 752 | | 300 | | |
| 7 | | 1356 | | 848 | | 456 | | 200 | | | |
| 8 | 1320 | | 552 | | 296 | | 92 | | | | |
| 9 | | 276 | | 144 | | 48 | | | | | |
| 10 | 304 | | 96 | | 32 | | | | | | |
| 11 | | 24 | | 0 | | | | | | | |
| 12 | 64 | | 8 | | | | | | | | |
| 13 | | 0 | | | | | | | | | |
| 14 | 4 | | | | | | | | | | |

The mean value of M(x) is 5.506 with a standard deviation of 1.596. Inspection of the above table shows that the contribution to the autocorrelation value from skywaves offset 2 or more bits exceeds 10 in absolute value for only 100 codewords out of 25,740, or about 0.39% of the time, i.e., 24 at an offset of 3 have a value of 11, 64 at an offset of 2, and 8 at an offset of 4 have a value of 12, and 4 at an offset of 2 have a value of 14. In addition, a value of 9 is obtained for only 532 codewords out of 25,740, or about 2.07% of the time. Thus, if a groundwave acceptance threshold is set at a value of 11 or more, the probability of correctly determining the groundwave signal will be 99.6%.

If the 25,740 codewords are randomly selected to encode the LORAN signal, the predictability can be determined with the equations previously given. From equation (13) the expected redundancy can be found to be 3.092. Thus, one could be expected to guess correctly 9.546 of the 16 bits of a codeword. The mean time to certainty from equation (15) is 15.222 bits. These figures indicate an acceptably low level of predictability.

Thus, by encoding the LORAN signal with codewords derived from constant ratio codewords which are their first difference, the LORAN signal will have desirable autocorrelation properties which will permit the rejection of virtually all skywaves, and insure synchronization with the groundwaves. Furthermore, by randomly selecting the words used to encode the signal from the set of 25,740 possible codewords which give the desired autocorrelation properties, low predictability and hence, ECCM enhancement is provided.

Turning now to the FIG's, there is illustrated in FIG. 1 a block diagram of a device for forming codewords having specifiable autocorrelation properties, which may be used to encode a signal for transmission. The X codewords are formed from a jth difference codeword, $Y_j$, which is constructed so as to provide X codewords having the desired autocorrelation properties. Throughout the following discussion, it is assumed that the X codeword is an n-bit codeword as given by equation (1).

There is illustrated in FIG. 1, a register 10 for storing a jth difference codeword, $Y_j$, from which the X codeword is constructed. The $Y_j$ codeword comprises n-j bits as defined by equation (5). The codeword in register 10 is shifted out bit-by-bit to mod 2 adder 12. The output of mod 2 adder 12 is fed to a j-bit register 14, shifted in synchronism with register 10. The output of this register 14 is a X codeword having as its jth difference, the codeword $Y_j$ stored in register 10. The output of register 14 is also fed back to mod 2 adder 12 where it is combined with the output from register 10, prior to being input to the j-bit register 14. The bits of the X codeword are related to the $Y_j$ codeword by equation (4), and the autocorrelation value of the codeword X at offset j is given by equation (6). The $Y_j$ codeword is constructed so as to produce the desired autocorrelation value at an offset of j.

Initially, register 10 is loaded with a jth difference codeword $Y_j$, and register 14 is loaded with j bits which may be arbitrary. Thereafter, registers 10 and 14 are shifted in sequence to produce the X codeword. The first j-bits of the X codeword will be the j-bits stored in register 14. Thereafter, the next n-j bits of the X codeword will be determined by the result of the mod 2 addition of 1-bit of the $Y_j$ codeword with a bit of the X codeword which is output from register 14. The low predictability feature of the X codeword is provided by loading register 10 with randomly selected jth difference codewords $Y_j$ and by loading register 14 with j random bits.

FIG. 2 is a more detailed illustration of the apparatus of FIG. 1 in which X codewords are generated from a constant ratio codeword which is the jth difference codeword of the X codewords, to provide X codewords having the desired autocorrelation and low predictability properties. As illustrated, the jth difference codeword register 10 of FIG. 1 for storing a constant ratio codeword is composed of two storage/shift registers 16, 18, designated as register A and register B. The sum of the storage locations in the two registers is equal to n-j bits. There is further provided a register C having j storage locations, corresponding to j-bit register 14 of FIG. 1. Each of the three registers has its respective input and output connected to control logic 20, to be more fully described hereinafter. There is further provided to each of the three registers, a shift line for shifting the contents stored in each register and a load line for initializing each of the three registers with a predetermined bit pattern. Also connected to control logic 20 is a key generator 22 which provides a pseudo-random binary sequence which serves as a source of control bits for control logic 20. Control logic 20 also provides a clock signal to key generator 22.

Internal to control logic 20 are switching circuits which dynamically interconnect the inputs and outputs of registers A, B and C under control of the pseudo-random control bits from key generator 22. Control logic 20 further contains timing circuits which generate the clock signals to key generator 22 as well as the shift controls to the three registers A, B and C. Also contained in control logic 20 is the mod 2 adder 12 of FIG. 1 which is used for the construction of the X codewords.

The operation of the apparatus of FIG. 2 is illustrated in FIG. 3. Upon initialization of the system, each of the three registers A, B and C is loaded as illustrated in FIG. 3A. Register A is loaded with an initial fill of all 1's while register B is loaded with an initial fill of all 0's. The respective lengths of registers A and B are selected to provide the desired constant ratio of 1's to 0's. Register C is loaded randomly with bits from key generator 22. For example, in the LORAN system which uses 16-bit words, it is desired to encode the transmitted signal such that it has a low autocorrelation value at an offset of one bit in order to discriminate between sky-waves and groundwaves. In this case N=16 and j=1. Therefore, registers A and B together contain 15 bits and register C contains one bit. As before, in order to provide the autocorrelation properties, it is desired that the ratio of 1's to 0's in the first difference codeword $Y_1$ be approximately equal, which is obtained when $Y_1$ contains either 7 or 8 ones. This criterion is satisfied if register A is selected to be 8 stages in length and register B is selected to be 7 stages in length. In order to provide a random constant ratio first difference codeword, $Y_1$, registers A and B can then be randomly interconnected, either together or upon themselves, and shifted, a large number of times. After a large number of random interconnections and shifts, the bit pattern contained in registers A and B will be random but the density of 1's to 0's will be the same as the initial load. This codeword can then be combined with the contents of register C, as illustrated in FIG. 1, to produce an X codeword. This is accomplished in the following manner.

Figure 3B:
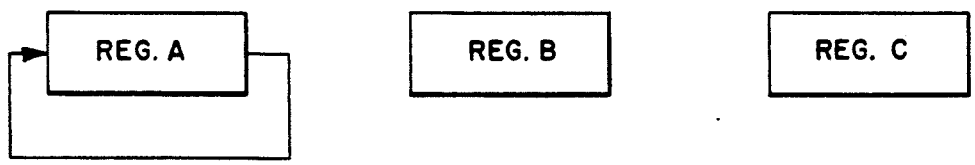
Figure 3C:
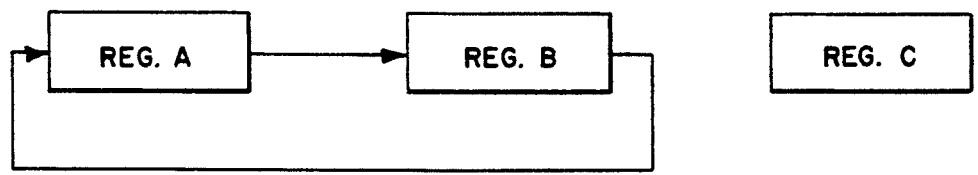
Figure 3D:
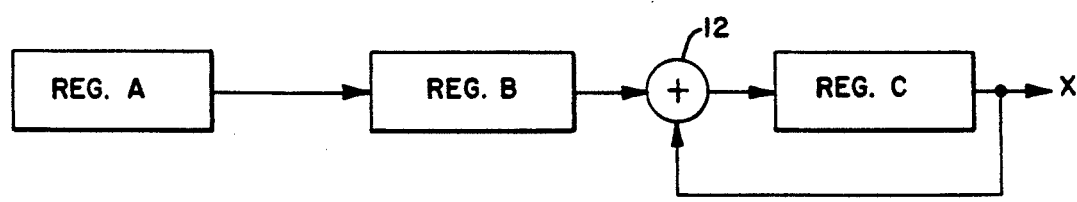

After an initial fill is loaded into each of registers A, B and C as illustrated in FIG. 3A, the switching circuits contained in control logic 20 interconnect registers A and B as illustrated in FIG. 3B and FIG. 3C in response to the value of the control bit input from key generator 22. If the value of the pseudo-random control bit from key generator 22 is a zero, the output of register A is connected to its input, as illustrated in FIG. 3B, and register A is shifted one position. If however, the value of the control bit from key generator 22 is a 1, registers A and B are connected together and the output of register B fed back to register A as illustrated in FIG. 3C. Registers A and B are then each shifted simultaneously one position. This process is then repeated a large number of times, e.g. 50 times. Since the control bits from key generator 22 are pseudo-random, the sequence of interconnections and shifts applied to registers A and B is also pseudo-random. Consequently, after a large number of such operations, the bit pattern existing in registers A and B together represents a pseudo-random first difference codeword, $Y_1$, which has the same density of 1's to 0's as the initial fill. Thus, a pseudo-random constant ratio first difference codeword has been produced. The switching circuits in control logic 20 then connect registers A and B together with mod 2 adder 12 and register C as illustrated in FIG. 3D. Registers A, B and C are then each supplied with n shift pulses to produce the n-bit X codeword. This codeword is used to encode one word of the LORAN transmission. The process just described and illustrated in FIG. 3 is repeated to generate a new X codeword for the next, and each subsequent, LORAN word.

Since each X codeword is constructed from a pseudo-randomly generated first difference constant ratio codeword, the X codewords appear random to an unintended recipient. Because of their apparent randomness, the X codewords have very low predictability. This makes jamming difficult and provides enhanced ECCM capabilities for the system.

The control logic required to interconnect the registers as illustrated in FIG. 3 can be easily implemented with standard logic gates, in a number of ways known to those skilled in the art. Furthermore, the number of registers and their lengths may be varied, and other types of interconnections and shifting operations may be used, equally as well, by appropriately varying the control logic. In general, for minimum predictability, the decomposition of the (n−j) bits into registers and the specific manner in which they are shifted by the operation of the control logic, should be such that after a sufficient number of control operations (always less than or equal to n!), all possible combinations of the specified densities in the (n−j) bits can be obtained, i.e., the shifting operations generate the full permutation group on the (n−j) bits.

While the foregoing has been with reference to particular embodiments, it will be appreciated by those skilled in the art that numerous variations are possible without departing from the spirit of the invention. It is intended that the invention be limited only by the appended claims.

What is claimed is:

1. An apparatus for generating n-bit codewords, $X=(x_0, x_1, \ldots, x_{n-1})$, for encoding a signal to provide predetermined autocorrelation properties at an offset of j bits, comprising:

means for generating (n−j)-bit constant ratio codewords, $Y_j=(y_0, y_1, \ldots, y_{n-1-j})$, said codewords having a predetermined ratio of logical 1's to logical 0's, and said codewords being the jth difference of said X codewords, wherein the bits of said X and $Y_j$ codewords are related according to the equation $y_i = x_i \oplus x_{i+j}$; and means for combining the n−j bits of said $Y_j$ codewords with j arbitrary bits to form said n-bit codewords, X.

2. The apparatus of claim 1 wherein said generating means includes means for pseudo-randomly generating said $Y_j$ codewords, thereby providing X codewords having a low predictability.

3. The apparatus of claim 2 wherein said pseudo-random generating means includes a key generator for generating a stream of pseudo-random control bits.

4. The apparatus of claim 3 wherein said pseudo-random generating means further comprises:

a plurality of first shift registers each having an input and an output, said plurality of shift registers having a total of n−j stages for the storage of bits; and control means connected to said shift register inputs and outputs and responsive to the values of said pseudo-random control bits, for interconnecting said inputs and outputs and for shifting said shift registers in a predetermined manner in accordance with said values.

5. The apparatus of claim 4 wherein said control means includes means for interconnecting and shifting said shift registers in synchronism with said stream of control bits for a predetermined number of times.

6. The apparatus of claim 5 further including means for providing an initial fill to said n−j shift register stages, said initial fill having said predetermined ratio of logical 1's to logical 0's and said interconnecting and shifting means being characterized in that said ratio remains constant after each interconnection and shift, thereby providing said pseudo-random constant ratio codewords, $Y_j$.

7. The apparatus of claim 6 further comprising a second shift register having an input and an output and j stages for the storage of said arbitrary j bits, for combining with said $Y_j$ codewords to form said n-bit codewords, X, including means for initially filling said j stages with j pseudo-random bits from said key generator, and wherein said combining means further includes a mod 2 adder adapted to be connected, in response to said control means, to the output of said first shift registers containing said $Y_j$ codewords and the input and the output of said second shift register containing said j pseudo-random bits, such that the output of said second j-bit shift register may be mod 2 added to said $Y_j$ codewords stored in said first shift registers to form said X codewords.

8. The apparatus of claim 1 wherein said j-bit offset is one bit and said $Y_1$ codewords have a ratio of 1's to 0's approximately equal to one, thereby providing a signal having a low autocorrelation value at an offset of 1 bit.

9. A method of constructing n-bit codewords, $X = (x_0, x_1, \ldots, x_{n-1})$, for encoding a signal for transmission to provide signal properties facilitating rejection at a receiver of multipath signal waves arriving at the receiver delayed with respect to direct waves, comprising the steps of:

generating a sequence of (n-j)-bit codewords $Y_j = (y_0, y_1, \ldots, y_{n-1-j})$, where the expected delay between the time of arrival of the direct and the multipath signal waves is j bits, said $Y_j$ codewords being the jth difference of said X codewords wherein the bits of said X and $Y_j$ codewords are related according to the equation $y_i = x_i \oplus x_{i+j}$, said $Y_j$ codewords further being characterized as constant ratio codewords having a ratio of logical 1's to logical 0's approximately equal to one; and combining said $Y_j$ codewords with j arbitrary bits to form said X codewords.

10. The method of claim 9 wherein said generating step further comprises the step of pseudo-randomly generating said $Y_j$ codewords, thereby providing X codewords having low predictability.

11. The method of claim 10 wherein said generating step further comprises the steps of loading an (n−j)-stage storage register with an initial fill of n−j bits, said bits having a ratio of logical 1's to logical 0's approximately equal to one; and pseudo-randomly interchanging the bits in said n−j stages to construct said pseudo-random codewords, $Y_j$.

12. The method of claim 11 wherein said combining step further comprises the step of combining said pseudo-random codewords, $Y_j$, with j pseudo-randomly generated bits, $z_0, z_1, \ldots, z_{j-1}$, to form said X codewords such that the bits of said X codewords are defined by $$x_i = \begin{cases} z_i & , \text{for } i < j \\ y_{i-j} \oplus x_{i-j} & , \text{for } j \leq i \leq n-1. \end{cases}$$

13. The method of claim 9 wherein said expected offset is 1 bit and said $Y_1$ codewords are the 1st. difference of said X codewords.

* * * * *